UNITED STATES PATENT OFFICE.

ANDREW LANERGAN, OF BOSTON, MASSACHUSETTS.

IMPROVEMENT IN DISINFECTING-PASTILES.

Specification forming part of Letters Patent No. 15,243, dated July 1, 1856.

*To all whom it may concern:*

Be it known that I, ANDREW LANERGAN, of Boston, in the county of Suffolk and State of Massachusetts, have invented a Disinfecting or Chlorine-Gas-Producing Pastile; and I do hereby declare that the same is hereinafter fully described.

The principle on which my invention is based is the combining of chemical salts having large amounts of oxygen in their composition with chlorine salts and combustible matter, so that when the mixture is ignited slow deflagration will take place, attended by the elimination of chlorine or hydrochloric-acid gas.

In carrying out my invention I generally use nitrates and chlorides of alkaline or alkaline earthy bases with charcoal and a small proportion of shellac, and I so balance the weights that nascent carbonic acid and oxides of nitrogen produced may react on chlorides present. I have found that nitrates of the alkaline earthy bases, in deflagrating with carbon, produce so much of the oxides of nitrogen that chlorides present are decomposed, and the chlorine or hydrochloric-acid gas, in mixture with carbonic acid, is disengaged in a heated state and rises to the higher part of an apartment, from which it descends to mix with the air present, and thus remove any contagious matter.

I am aware that strong acids with chlorides and peroxides or nitrates will afford chlorine, and that hydrochloric acid may be obtained from salt and sulphuric acid; that hypochlorites and carbonic acid afford chlorine, and other disinfecting agents produce this gas.

My invention has for its object the manufacture of a permanent and portable form of solid matter, which, requiring no containing-vessel, may be ignited by means of a cigar, a flame, coal, or match, and applied to disinfect the air of an apartment, the cabin of a vessel, or a water-closet; and in compounding or making such a pastile, I take of nitrate of baryta twenty-four ounces or parts, by weight; chlorate of potash, four ounces or parts, by weight; oxalate of soda, six ounces or parts, by weight; chloride of barium, four ounces or parts, by weight; oxide of manganese, one ounce or part, by weight; shellac, two ounces or parts, by weight; charcoal, nine ounces or parts, by weight; all being previously dried and finely powdered. These I moisten with a solution of gum, alcohol, and water, or any other proper solution, and thoroughly mix together. The paste resulting is next to be molded into proper forms, or may be spread of an even thickness and divided into pellets of the desired size, and dried. These materials and proportions I prefer; but I can vary the mixture, substituting other alkaline earthy nitrates for nitrate of baryta, and chlorates of alkaline earthy bases for chlorate of potash, only keeping in view the fact that nitrates of the alkaline earths and earths do not readily take up the carbonic acid produced at the moment of deflagration, so that, in conjunction with nitrous and hyponitrous vapors, it can decompose chlorides present, any excess escaping.

I am aware that pastiles have been and are made so as to throw off when burned an agreeable odorous smoke, whereby the air of an apartment may be impregnated with a pleasant effluvium. Such a pastile differs essentially from mine, which is a disinfecting agent, and is productive of chlorine gas, and although I have above represented a series of chemical materials which, when combined, on being burned will evolve such a gas, there are various others which may be employed with like effects under like circumstances.

I do not pretend that the gas evolved by the above-described composition when burned is free chlorine, as it may be combined with one or more other gases, the latter being in such small quantities as not to render useless the former as a disinfecting agent. My invention rests particularly on a chlorine gas or hydrochloric-acid gas combustible pastile or composition, or one which, when burned, will evolve such gaseous matter, either in a free state, or so combined in such large quantities with one or more other gases as to operate as a disinfecting agent; therefore

I claim as my invention—

A disinfecting pastile or composition made, substantially as described, so as to be capable of being ignited and burned, and while burning to evolve chlorine or hydrochloric-acid gas, either in a free state, or so combined or mixed with one or more other gases as to be capable of acting as a disinfecting agent.

In testimony whereof I have hereunto set my signature this 14th day of May, 1856.

ANDREW LANERGAN.

Witnesses:
R. H. EDDY,
F. P. HALE, Jr.